Sept. 7, 1954     E. HEYSER     2,688,510
ROPE DROP
Filed Nov. 9, 1949
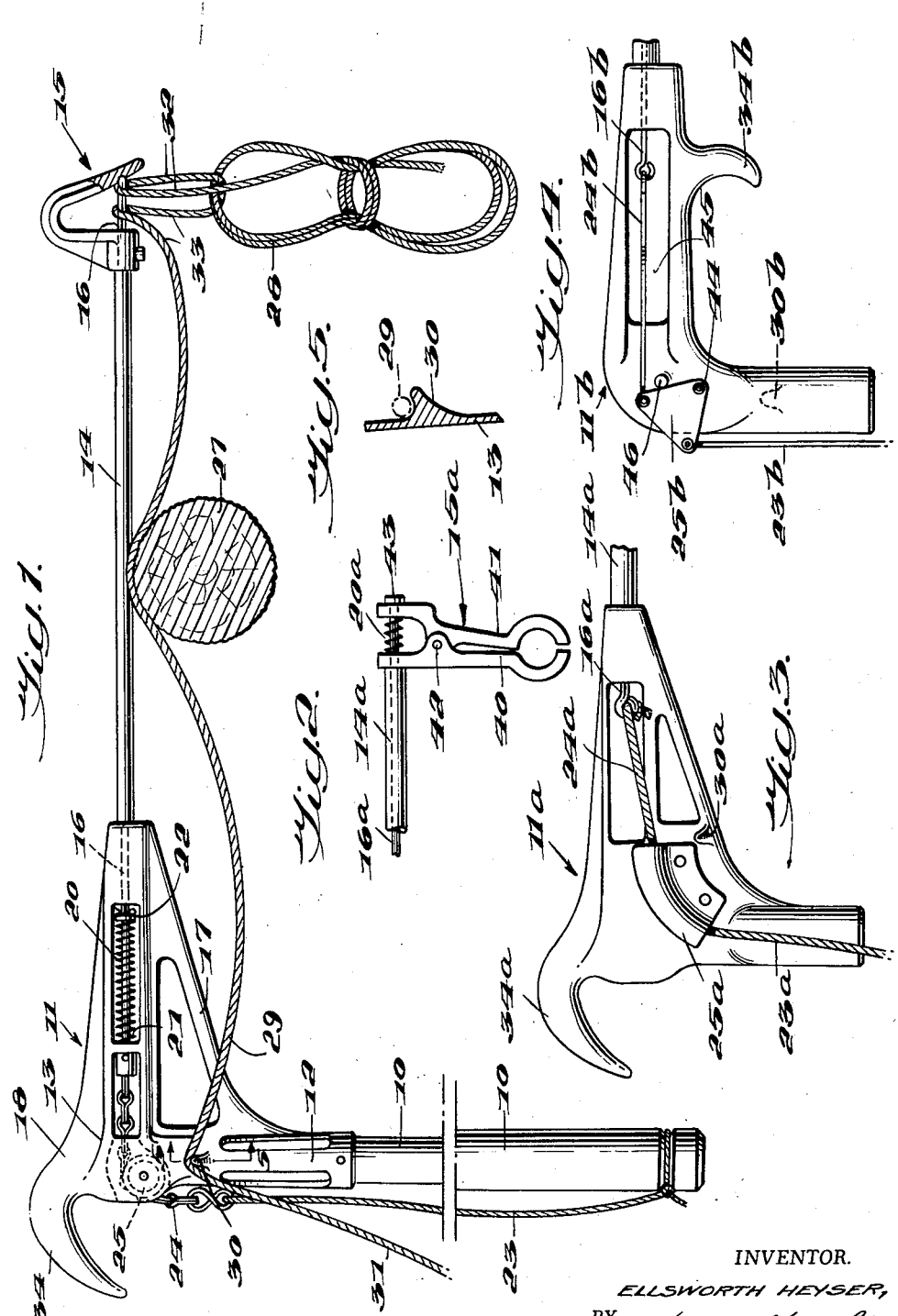
INVENTOR.
ELLSWORTH HEYSER,
BY Hall + Houghton
ATTORNEYS Patented Sept. 7, 1954

2,688,510

UNITED STATES PATENT OFFICE 2,688,510

ROPE DROP

Ellsworth Heyser, Norristown, Pa.

Application November 9, 1949, Serial No. 126,325

8 Claims. (Cl. 294—19)

This invention relates to rope dropping and aims generally to provide a simple and effective manner of supporting a rope to be dropped and simple and effective means for dropping the rope over a selected tree limb, for example, for use in tree surgery and like operations.

In tree surgery, lumbering and like operations, it is frequently necessary or desirable that a rope be placed over a selected member such as a tree limb and that its two ends be retrieved by the climber or other operator, to facilitate climbing, drawing of the limb toward the operator, or for other purposes. Heretofore no simple and effective means has been available for such purpose. Attempts to throw weights to which ropes are attached over desired limbs are time-wasting and ineffective, as limbs other than those desired are usually caught by the rope, or tangling of the rope in the tree occurs, sometimes even rendering it difficult to retrieve the rope for another try. In addition, such throwing procedures, either of a weight, or of a coil of rope, are difficult of execution by a climber already in a tree and hampered by his equipment and the surrounding branches, and necessity for re-coiling the rope as well as premature uncoiling thereof adds to the difficulties experienced.

The present invention aims to overcome these difficulties and has for its principal objects the provision of an effective mode of supporting the rope to be dropped and a simple apparatus for positively but releasably holding a length of rope so arranged that the rope may be placed over and dropped beyond a selected limb, for example.

Other objects of the invention, severally and interdependently, are the provision of a suitable pole-supported head having a lateral or cantilever extension provided with retaining means to engage and support a rope coil to be dropped, and remotely controllable means for releasing the retaining means for dropping the coil; the provision of a pole-carried rope drop device with means for facilitating retrieving of the dropped rope and to bring it to the hand of the operator, or clear it from underlying limbs, or the like; the provision of a simple releasable retaining means for supporting a rope so coiled as to fall loosely when released; the provision of a simple method of supporting coiled rope so it may freely uncoil when released but be securely held against premature uncoiling; the provision of a rope drop with means for supporting the standing part of the rope leading to the dropped portion thereof; the provision of a rope drop with standing part supporting means from which the rope may be easily disengaged; and the provision of novel subsidiary elements and combinations and sub-combinations of structure contributing to the production of a simple, positive, and economical rope drop. The invention consists in the several features, constructions and combinations hereinafter described with reference to exemplary embodiments, and defined in the appended claims.

In the accompanying drawings of exemplary embodiments:

Fig. 1 is a partially cut-away side elevation of the preferred form of pole-carried rope drop of the invention shown in relation to the cross-section of a tree limb, by way of example, and showing the preferred mode of supporting the rope to be dropped.

Fig. 2 is a side elevational detail of a modified form of releasable retaining means.

Figs. 3 and 4 are side elevational details of modified forms of heads incorporating modified elements.

Fig. 5 is a detail in section taken on the line 5—5 of Fig. 1 looking in the direction of the arrows.

In the preferred form of the invention, as shown in Fig. 1, the entire device comprises a pole 10 of any desired length, sixteen feet being suitable, for example, and a head 11 having a pole end receiving socket 12, or otherwise adapted to be mounted on the pole. In the form shown, the head comprises a main portion 13 provided with a tubular or pipelike element 14 extending laterally thereof, provided with a downwardly opening retainer 15 at the outer end thereof. A member 16 is reciprocable in the tubular element 14, to the advanced position shown in Fig. 1, in which it closes the downwardly opening retainer, and to a retracted position in which it opens the downwardly opening retainer. In the form shown, the tip of the member 16 enters a recess in the member 15 in its advanced position.

Still referring to Fig. 1, the frame 13, which may be provided with suitable bracing elements, as struts or webs 17, 18, has various weight-reducing openings therein, and suitable means is provided for urging the rod or member 16 toward its advanced position, herein shown as a coil spring 20, surrounding a portion of the rod or reciprocating member 16 and compressed between the frame shoulder 21 and a rod-carried abutment 22, shown as formed by a washer held in place by a cotter-pin passing through the rod. For retracting the rod or member 16 against the tension of the spring means 20, operator-controlled means is provided, comprising, in the form shown, a trip- or pull-cord 23 depending from the head near the inner or pole-end of the lateral arm or extension, and retractingly connected to the reciprocable rod 16, such connection being effected, in the form of Fig. 1, by a short section of chain 24 extending from the cord 23 about a pulley 25 positioned between a slotted or bifurcated portion of the head, and attached to the rod 16.

If desired, when using the pull-cord 23 as shown, this cord may be detachably anchored to the lower end of the pole 10; and when desired, this cord may be detached from the lower end of the pole and its free end be carried upwardly by a climber to an elevation higher than that at which the top of the pole is resting, so that the cord 23 may be used to pull the pole upwardly to the climber at a position near which it cannot be hung from below. Similarly, when it is desired to lower the tool from a high elevation to the ground or to an assistant on the ground, the rope 23 may be used for this purpose, eliminating danger of breaking the tool and need for recoiling a snake line.

Still referring to Fig. 1, the rope to be passed over the limb 27 is shown as comprising at 28 a portion to be dropped supported in the retaining means 15 and at 29 a standing part extending therefrom and supported near the inner end of the laterally extending arm by suitable means, preferably in the form of a shelf-like support 30. As is best shown in Fig. 5, this support 30 is preferably shallowly dished on its upper rope-supporting side so that the rope held by the weight of the standing end 31 (which leads to the operator's hand) and of the coiled part 28, will be drawn tightly thereon, and thus be held in place close to the pole 10 while the device is being manipulated. For purposes of clarity, the rope standing part 29 in Fig. 1 is shown slacked off. In use of the device, it extends in a much straighter line from the retainer 15 to the support 30, and has no tendency to jump out of the shelf 30 while the rope is being raised to the position at which it is to be dropped. After the rope 28 has been dropped over the limb 27, the advantage of shallowness of the shelf depression 30 is realized; because the standing part 29 is then easily disengaged from shelf 30, as by a quick shake of the operator's hand throwing a wave up the rope.

As has been mentioned above, one of the features of the invention resides in the preferred mode of supporting the rope so that it will uncoil smoothly when dropped but be safe against premature uncoiling. The method of obtaining this advantage is illustrated in Fig. 1, from which it will be seen that the rope is supported by coiling the portion 28 to be dropped, flattening opposite sides of the coil together and winding the standing part at least twice about the same, forming a bight 32 in the standing part proximate to the wrapped coil, passing this bight through one of the open loops of the wrapped coil and supporting the coil by the said bight and a loop 33 formed in the standing part 29 proximate to the coiled portion 28 and the supporting bight 32. For clarity a relatively slender rope has been illustrated and only a few turns thereof have been shown in coil 28 and in the waist winding thereon, and these turns have been shown in loose or open form, but it will be appreciated that larger and more turns of rope and tighter drawing of the turns does not depart from the principles disclosed.

The inner end of the head 11, in the form of Fig. 1, is provided with a multi-purpose hook 34, preferably facing downwardly and toward the pole as shown. If the rope 28 has been dropped over a limb 27 that is not directly above the climber, he may use this hook to reach the hanging rope 28 and pull it back to him while still holding onto the end of the standing part 31; then having two ends of the rope 28—31 he can proceed to climb to the limb 27 or use the rope for lowering that limb or associated limbs. If the rope drops beyond several limbs, it may be snaked back over all except the selected limb 27, by means of the said hook, and the hook may also be employed for other than these special purposes, as for hanging the tool on a small branch, when not in use, or pulling small branches and the like to break them off or bring them within reach of the operator.

Various modifications of the several elements of the device may be made within the scope of the invention, which in its broader aspects is not limited to the preferred form. Merely by way of illustration, and with no intention of being limited thereto, exemplifying modifications are set forth herein. As shown in Fig. 2, for example, the downwardly opening retainer 15a may take the form of a clamp having a stationary element 40 and a retractable element 41 pivoted at 42 to be advanceable toward the element 40 to close the retainer clamp, or retractable therefrom to open the same. The spring 20a, as shown in Fig. 2, may be placed about the reciprocable rod or member 16a at the outer end of the arm 14a, and in this arrangement may hold the clamp member 41 in engagement with the rod abutment 43. While this clamp form of retainer is not as proof against inadvertent opening as is the form of Fig. 1, it has the advantage that it may be used to pick up a rope or other object by opening the clamp and letting it tighten on the object. This is helpful in shifting a rope along a rough branch, for example. The head 11a, shown in Fig. 3, involves a simplified arrangement of the trip or pull cord. In this arrangement the cord 23a may connect directly to the rod 16a (see Fig. 2) as at 24a and may pass over a slideway or arcuate guide 25a to change the direction of pull. Similarly the shelf-like support 30a, as herein shown, may be otherwise associated with the head than in the manner shown in Fig. 1. The multi-purpose hook (34, Fig. 1; 34a, Fig. 3) may be variously positioned, as exemplified at 34b, Fig. 4, where it is carried under the laterally extending arm of the rope dropping device. Also as shown in this figure, other forms of interconnection between the trip 23b and the retainer releasing means 16b may be employed, herein exemplified by the bell crank 25b pivoted at 44 and the link element 24b, which may be laterally bent, as shown at 45 when the direction-changing element 25b is placed other than in approximate alignment with the rod 16. A suitable stop, such as the pin or abutment 46, may be employed with this type of connection, when it is desired to enable use of the trip cord 23b for lifting and lowering of the tool, as above described; and it will be understood that in the embodiment of Fig. 1, this function is afforded by the pulley housing of head 11 which supports the chain 24 and avoids side-pull on the parts during such lifting and lowering operations. It will be noted that in Fig. 4 the shelf element 30b is shown only on the rear side of the head 11b, and it will be appreciated that such shelf means may be disposed in any suitable way; for example, on either or both sides of the tool, as may be most convenient.

It will be apparent that by the features of this invention simple and effective provision is made for the supporting and dropping of rope parts where desired; that the specific embodiments herein disclosed are illustrative and not restrictive of the invention, the scope of the invention being defined in the appended claims; and that all modifications which come within the meaning or range of equivalency of the claims are therefore intended to be included therein.

I claim as my invention:

1. A rope dropping device comprising a pole, a head carried by said pole, said head comprising a lateral arm, means at the outer end of said arm for releasably retaining a portion of rope to be dropped, means for supporting a standing portion of the rope near the inner end of said arm, said last named means comprising an outstanding shelf over which said standing part may be laid, and means for releasing said retaining means.

2. A rope dropping device to be carried by a pole comprising a head for mounting on a pole, said head comprising a lateral arm, means at the outer end of said arm for releasably retaining a portion of rope to be dropped, means for supporting a standing portion of the rope near the inner end of said arm, and means for releasing said retaining means.

3. A rope dropping device to be carried by a pole comprising a head for mounting on a pole, said head comprising a lateral arm, means at the outer end of said arm for releasably retaining a portion of rope to be dropped, means for supporting a standing portion of the rope near the inner end of said arm, said last named means comprising an outstanding shelf over which said standing part may be laid, and means for releasing said retaining means.

4. In a rope dropping device, a head, means for mounting said head on the end of a pole, a transverse element extending laterally from said head, a downwardly opening retainer at the outer end of said element, a shelf-like support near the inner end of said element, a member reciprocable in said element to advanced and retracted positions, said member in its advanced position closing said downwardly opening retainer, spring means urging said member toward its advanced positions, and operator controlled means for retracting said member against the tension of said spring means.

5. A rope dropping device comprising a pole, a head carried by said pole, said head comprising an arm extending a substantial distance laterally from the pole, downwardly opening means for releasably retaining a hank of rope, said means being positioned at the outer end of said laterally extending arm and being spaced laterally from the axis of the pole thereby, and means for releasing said retaining means, said arrangement enabling a hank of rope to be lifted and passed over a tree limb and dropped therebeyond while the pole is held substantially vertically.

6. A rope dropping device comprising a pole, a head carried by said pole, said head comprising an arm extending a substantial distance laterally from the pole, means for releasably retaining a hank of rope, said means being positioned at the outer end of said laterally extending arm and being spaced laterally from the axis of the pole thereby, means for supporting a standing portion of the rope near the inner end of said arm substantially in alignment with said pole, and means for releasing said hank retaining means, said arrangement enabling a hank of rope, with a standing part descending along the pole, to be lifted and passed over a tree limb and dropped therebeyond while the pole is held substantially vertically.

7. A rope dropping device to be carried by a pole comprising a head for mounting on a pole, said head comprising a pole receiving socket and a lateral arm extending for a substantial distance at approximately right angles to the axis of said socket, downwardly opening means at the outer end of said arm for releasably retaining a hanked portion of rope in laterally spaced relation to the pole receiving socket, and means for releasing said retaining means.

8. In a rope dropping device, a head, means for mounting said head substantially vertically on the end of a pole, a transverse element extending laterally from said head and having its outer end displaced horizontally a substantial distance from the pole, a downwardly opening retainer at the outer end of said laterally extending element for releasably retaining a hanked portion of rope, said downwardly opening retainer comprising a member horizontally reciprocable to advanced and retracted positions, said reciprocable member in its advanced position closing said downwardly opening retainer, spring means urging said reciprocable member toward its advanced position for closing said downwardly opening retainer, and operator controlled means for pulling said spring advanced member to its retracted position against the tension of said spring means, said operator controlled means comprising a pulling element extending substantially vertically from near the inner end of said laterally extending element, and a pulling element extending substantially horizontally and connected to said reciprocable member at one end, said pulling elements being interconnected by means for changing the direction of pull from vertical to horizontal.

References Cited in the file of this patent

UNITED STATES PATENTS

| Number | Name | Date |
|---|---|---|
| 307,410 | Power | Oct. 28, 1884 |
| 338,606 | Morley | Mar. 23, 1886 |
| 370,179 | Brown | Sept. 20, 1887 |
| 845,180 | Krafft | Feb. 26, 1907 |
| 986,771 | Siegel et al. | Mar. 14, 1911 |
| 1,453,812 | Thomas | May 1, 1923 |
| 1,672,477 | Tipsord | June 5, 1928 |
| 1,895,758 | Goldsmith | Jan. 31, 1933 |
| 2,243,305 | Adler | May 27, 1941 |

FOREIGN PATENTS

| Number | Country | Date |
|---|---|---|
| 19,282 | Germany | Aug. 26, 1882 |

OTHER REFERENCES

The Ashley Book of Knots, Clifford W. Ashley; publisher, Doubleday & Company.